UNITED STATES PATENT OFFICE.

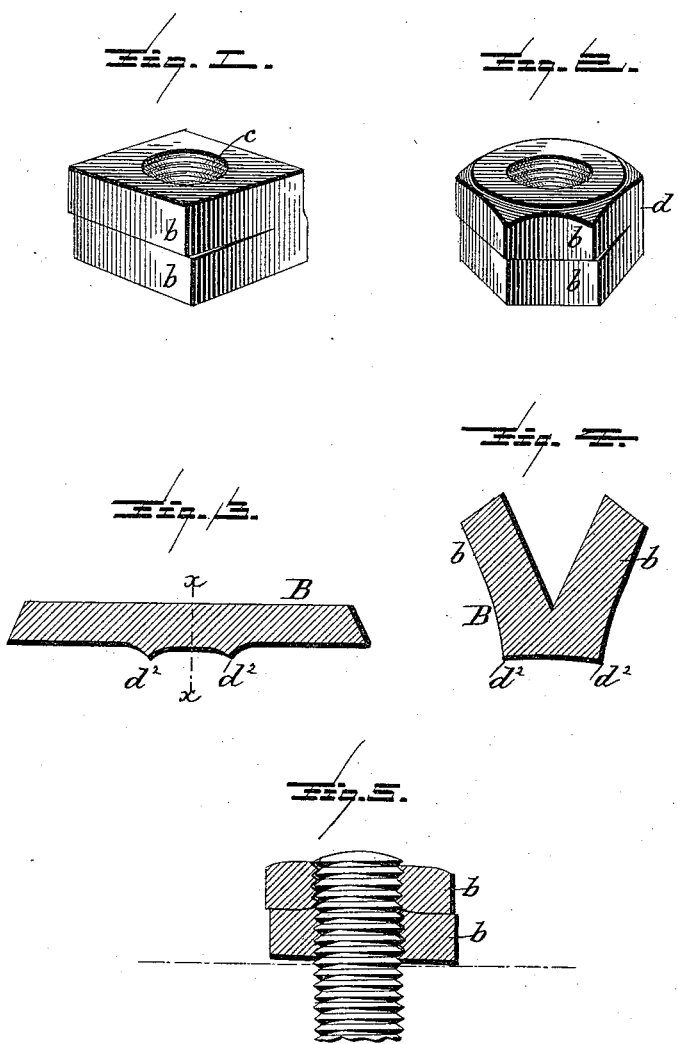

JULIUS CAESAR RICHARDSON, OF JAMESTOWN, NEW YORK.

NUT-LOCK.

SPECIFICATION forming part of Letters Patent No. 450,377, dated April 14, 1891.

Application filed December 29, 1890. Serial No. 376,067. (No model.)

*To all whom it may concern:*

Be it known that I, JULIUS CAESAR RICHARDSON, a citizen of the United States, residing at Jamestown, in the county of Chautauqua, State of New York, have invented certain new and useful Improvements in Nut-Locks, of which the following is a specification, reference being had therein to the accompanying drawings.

This invention relates to nut-locks which are provided with frictional means for engagement with the thread of bolts; and the object of my invention is to produce with as little loss of metal as possible a nut provided with a V-shaped slot within its body, and the two united leaves thus obtained slightly twisted and turned horizontally relatively to each other.

The invention is shown in the accompanying drawings, in which—

Figure 1 is a perspective view of a square nut constructed in accordance with my invention. Fig. 2 is a perspective view of a hexagonal nut constructed also in accordance with my invention. Fig. 3 is a transverse section of a bar of metal to be used to produce the nut. Fig. 4 represents a transverse section of the bar shown in Fig. 3 after it has been partly doubled upon itself on line $x\,x$ of Fig. 3. Fig. 5 is a transverse section of one of the finished nuts upon a bolt.

The preferred manner of producing the nuts is first to roll out the iron (or other metal) in bars B, having preferably a greater thickness in the center than at the edges, and whose cross-section is shown in Fig. 3. After one or more passes through rolls the bar assumes the Y form, substantially as shown in cross-section in Fig. 4, with two branches or leaves $b$ of equal length and thickness. The Y-shaped bar is then passed between rolls to bring the two branches or leaves $b$ substantially in close contact together. The Y-shaped bar can also be obtained by splitting a rectangular bar along one of its edges one-half of its depth or more with a blade of suitable form. The folded bar obtained by either one of said means is afterward subjected to a press-punch, by which the hole $c$ is punched in the center of the width of the bar, after which it is cut into the proper shape for nut-blanks of any desired form. The folded nut-blank is thus obtained at little expense with its leaves $b\,b$ in proper position relatively to each other and close together to have the central perforation screw-tapped. After the nuts have been screw-tapped the upper leaf is laterally forced and twisted slightly to the right, preferably, of the lower leaf, throwing the position of the threads of the upper leaf out of a straight line from that of the lower leaf.

The split nut, Fig. 5, represents the configuration of the thread and shows that the thread of the lower leaf enters the thread of the bolt the same as an ordinary nut, and when the thread on the bolt reaches the first thread of the upper leaf it has a tendency to tip the lower leaf of the nut slightly down on the right side; but when the nut reaches an abutment of plate against which the nut is to be screwed the lower leaf tips back to a right angle across the bolt and the nut takes a greater grip upon the bolt.

The mode of operation is nearly the same as when two nuts are jammed together by screwing one a little ahead of the other. It is tight in any position on the bolt; but it is most tight when brought against the abutment. By twisting the upper leaf to form the lock all the threads when the nut is screwed to position against an abutment bear all around on the bolt.

To permit the bar B to produce the side $d$ of the nut-blank with as little waste of material as possible, said bar is preferably provided with two angular ribs $d^2$, each equidistant from the line $x\,x$, Fig. 3, on which the bar is to be bent and doubled upon itself, and thus the rectangular edges shown at $d^2$ in Fig. 4 are obtained during the manufacture of the bar, out of which the nuts are to be cut and punched.

Although it is preferred to obtain the doubled-over bars by rolling the metal, it is evident they could be obtained by forging it.

Having now fully described my invention, I claim—

A nut having a slit parallel with its top or its bottom and dividing it into two parts, said parts being slightly twisted or turned relatively to each other, substantially as described.

In testimony whereof I affix my signature in presence of two witnesses.

JULIUS CAESAR RICHARDSON.

Witnesses:
FRED T. POWELL,
ORSELL COOK.